Patented May 10, 1938

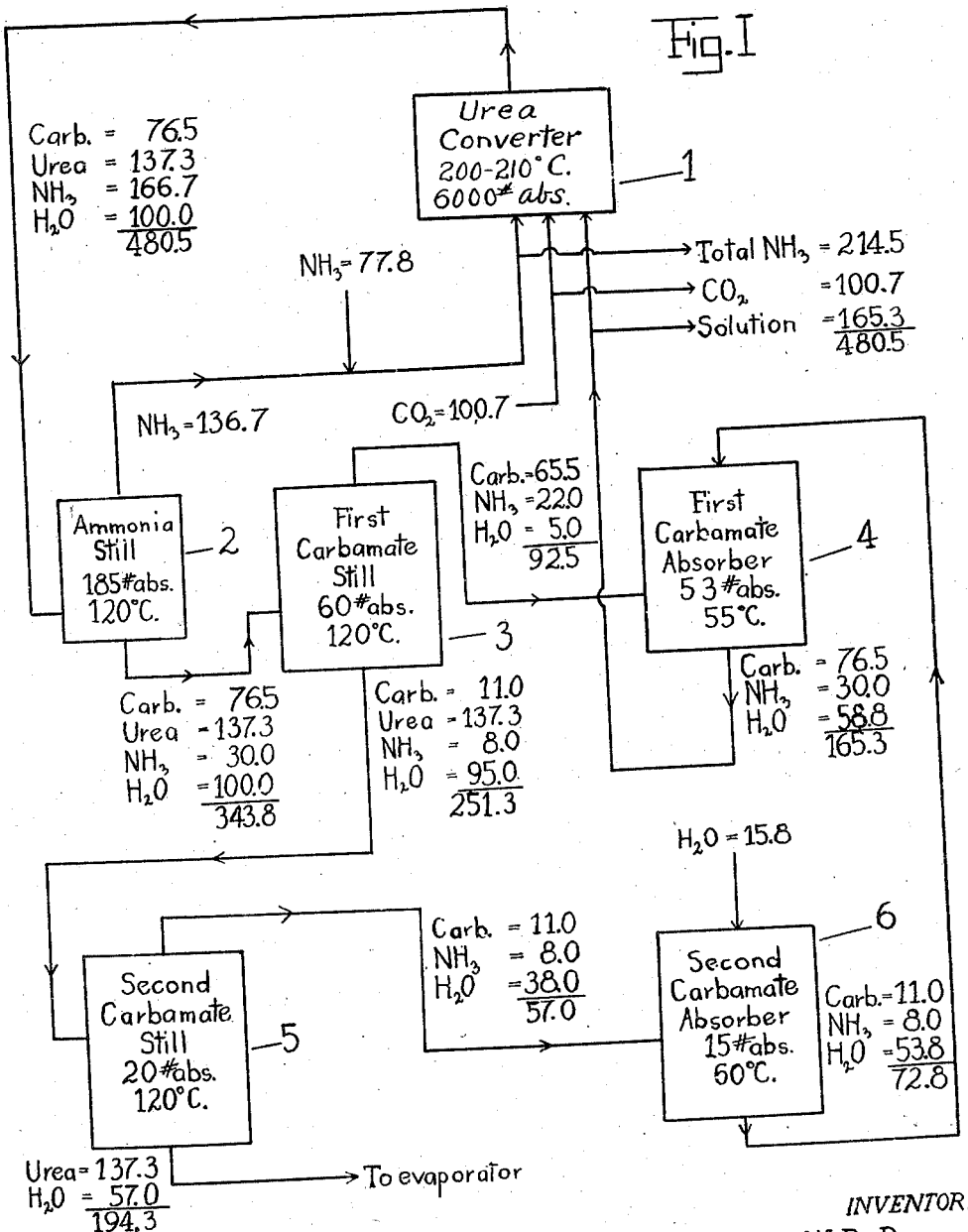

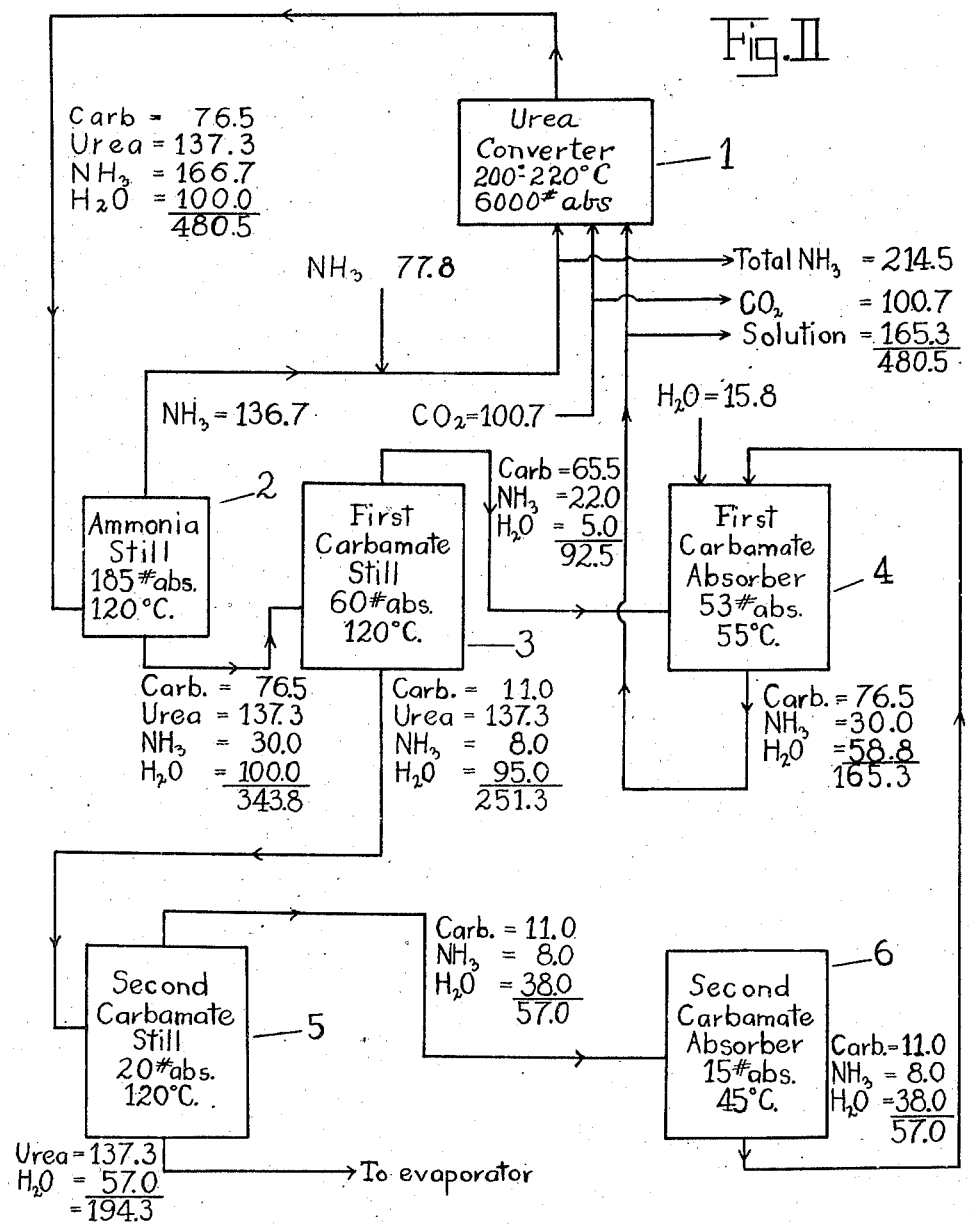

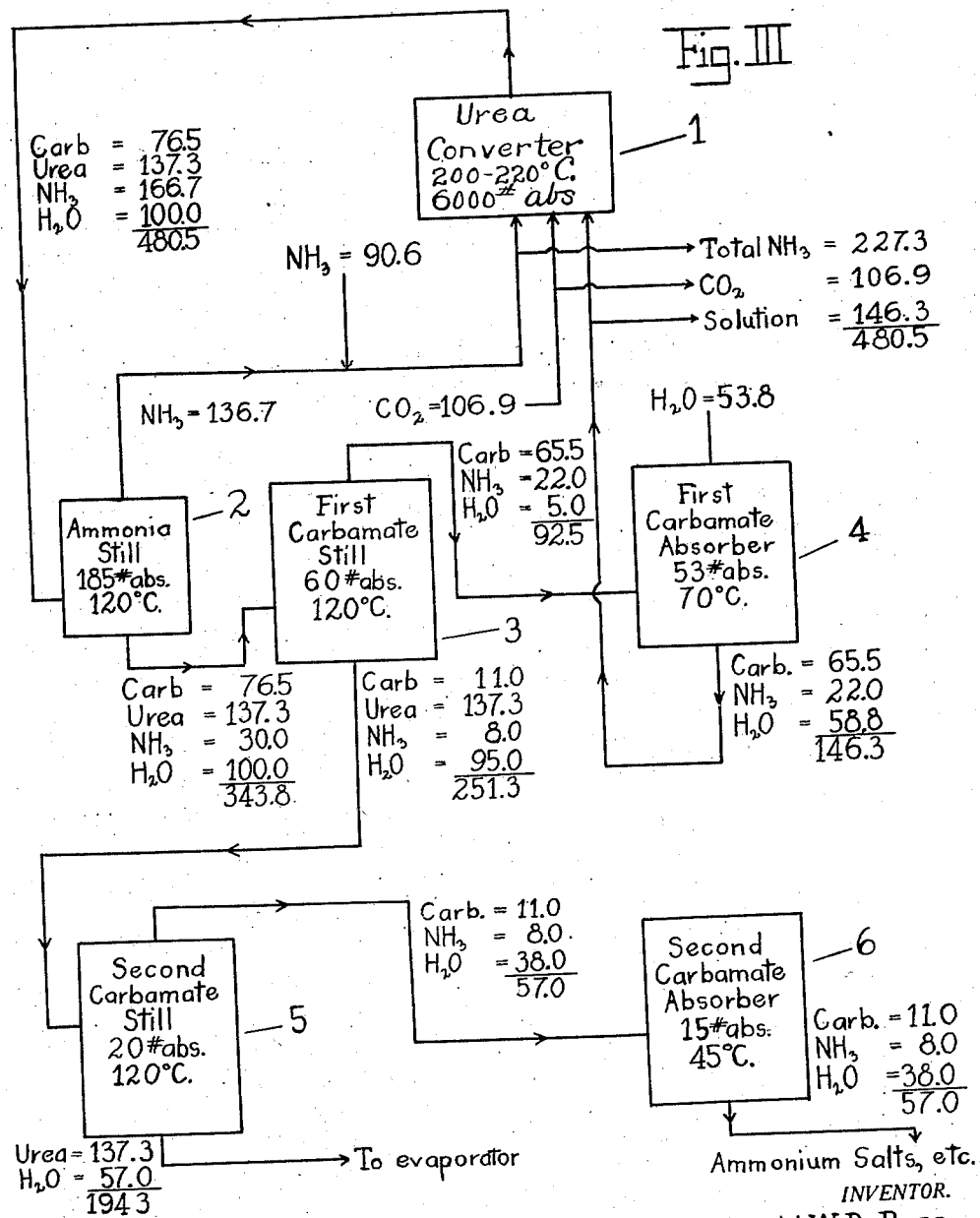
Fig. III

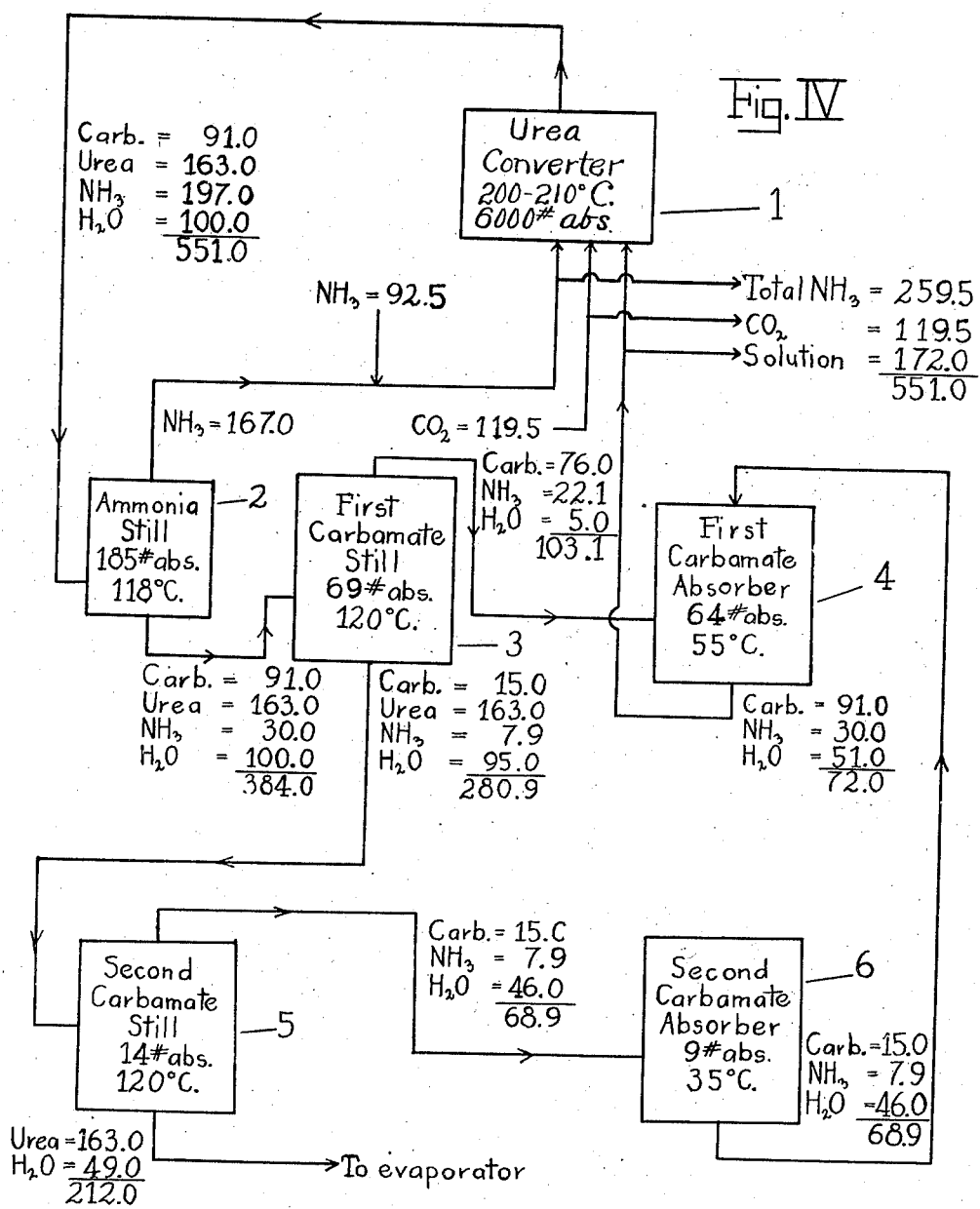

2,116,881

UNITED STATES PATENT OFFICE 2,116,881

UREA SYNTHESIS

Harald W. de Ropp, Wilmington, Del., assignor to E. I. du Pont de Nemours & Company, Wilmington, Del., a corporation of Delaware Application February 2, 1934, Serial No. 709,423

18 Claims. (Cl. 260—125)

This invention relates to the synthesis of urea from ammonia and carbon dioxide or compounds thereof and more particularly to an improved method for reutilization of reactants unconverted in urea synthesis.

It is known that when ammonia and carbon dioxide, or compounds of the same, are heated in a closed system a partial conversion to urea takes place. The reaction mixtures obtained, which for convenience will hereinafter be referred to as "urea synthesis melts" may vary widely in composition with varying proportions of reactants and/or with the extent to which the conversion to urea has taken place. The synthesis melts, for example, may contain various proportions of urea, ammonia, ammonium carbamate, carbonates, and water.

One of the uneconomical disadvantages heretofore attendant on the synthesis of urea from ammonia and carbon dioxide has been the difficulty of returning the unconverted reactants to the synthesis autoclave.

It is an object of this invention to provide an improved process for the removal from the urea synthesis melt and recirculation to the synthesis vessel of the reactants unconverted to urea.

Other objects and advantages of this invention will be apparent by reference to the following specification wherein the details and preferred embodiments are described.

I have found that great efficiencies in the urea synthesis may be accomplished, after synthesizing urea from ammonia and carbon dioxide, or compounds thereof, while utilizing an excess of ammonia over the stoichiometrical requirements at high temperatures and elevated pressures, by first removing the greater part of excess unreacted ammonia from the urea synthesis melt by distillation and subjecting the distillation residue to a further two-stage distillation for the removal of all or substantially all of the ammonium carbamate, the residual free ammonia, and at least a part of the water.

According to this invention, by the utilization of a two-stage ammonium carbamate and residual ammonia distillation, following a preliminary distillation of the greater part of excess unreacted ammonia, the amount of water returned to the reaction zone may be sufficiently lowered to effect considerably greater conversion efficiency than heretofore possible. If, for example, the distillation of residual free or unreacted excess ammonia and ammonium carbamate from the synthesis melt is attempted in one distillation step, after distillation of the major portion of excess ammonia has been accomplished, it is found that the amount of water carried over in this distillation and/or required to absorb and maintain the distillation products in liquid form, when returned with the unreacted constituents to the reaction zone for further conversion to urea is of an order such as to decrease greatly the conversion efficiency of the synthesis.

According to my invention, however, the amount of water carried over in distillation and/or required to absorb and maintain the products of distillation in liquid form is considerably lessened and higher conversion efficiency with consequent smaller over-all cost is obtained.

Pursuant to this invention, therefore, urea is synthesized at high temperatures and pressures from ammonia and carbon dioxide, or compounds thereof, in a closed reaction vessel, utilizing an excess of ammonia over the stoichiometrical requirements, and the urea synthesis melt comprising urea, ammonia, ammonium carbamate, and water passed to an ammonia still wherein the major part of the excess unreacted ammonia is distilled. This ammonia is preferably utilized in any desired manner and may be substituted for by fresh ammonia and/or returned, together with a quantity of added ammonia, to the autoclave for further reaction with carbon dioxide to form urea, while the distillation residue in the ammonia still is conducted to a first ammonium carbamate still and subjected to further distillation at a lower pressure than in the ammonia still with a resultant evolution of the major part of the residual excess ammonia, a major part of the ammonium carbamate and a relatively small quantity of water. This distillate is conducted to a first carbamate absorber and thence returned to the autoclave with or without added water or utilized as hereinafter described. The distillation residue is conducted to a second still wherein the remaining excess ammonia, ammonium carbamate, and a somewhat larger quantity of water than in the first carbamate still are completely removed by distillation, at a lower pressure than in the preceding still, and conducted to and condensed in a second carbamate absorber or absorbed in water contained in a second carbamate absorber maintained at a lower temperature and pressure than the still from which the reactants are distilled. The now purified still residue comprising a urea-water solution may be treated in a known manner for obtaining crystal urea, and the solution resulting from the absorption of the products coming from the last described still passed into the first described absorber, therein to absorb the first carbamate still distillate previously described and thence to the autoclave for further conversion, with additional quantities of ammonia and carbon dioxide, to urea.

The conditions of temperature and pressure followed in the urea synthesis, according to this invention, may vary over a wide range, my process being applicable generally to urea synthesis from ammonia and carbon dioxide or compounds thereof. Thus, for example, the synthesis may be satisfactorily accomplished at temperatures of from about 170–220° C., and pressures of from about 3000–6000 pounds per square inch pressure without departing from this invention or sacrificing any of the advantages thereof.

Various changes may be made in the details and methods of procedure according to this invention without departing therefrom or sacrificing any of the advantages thereof, as will be illustrated by reference to the following examples read in conjunction with the accompanying diagrammatic flow sheets.

*Example 1.*—Referring to Figure I, into a pressure resistant urea converter (1) there is introduced, in a cyclic system, 214.5 parts by weight of ammonia, 100.7 parts carbon dioxide, and 165.3 parts of a solution comprising water, ammonia and ammonium carbamate hereinafter to be described. These materials are caused to react at a temperature of 200–210° C., and about 6000 pounds per square inch absolute pressure to give a urea synthesis melt comprising 76.5 parts ammonium carbamate, 137.3 parts urea, 166.7 parts ammonia and 100 parts water. This urea synthesis melt is led to an ammonia still (2) where the melt is distilled at a pressure of 185 pounds per square inch absolute and 120° C., evolving 136.7 parts of ammonia which is reconducted together with 77.8 parts additional ammonia, to the autoclave (1) for further synthesis.

The distillation residue, comprising 76.5 parts ammonium carbamate, 137.3 parts urea, 30 parts ammonia and 100 parts water is thereafter conducted to a first carbamate still (3) and distilled at a temperature of 120° C., and 60 pounds per square inch absolute pressure to drive off 65.5 parts of ammonium carbamate, 22 parts ammonia, and 5 parts water. This distillate is thence conducted to a first carbamate absorber (4), maintained at 55° C., and 53 pounds per square inch absolute pressure where it is absorbed by passage thru a receiving liquid coming from a second carbamate absorber (6), hereinafter to be described.

The distillation residue in the carbamate still (3), comprising 11 parts ammonium carbamate, 137.3 parts urea, 8 parts ammonia, and 95 parts water, is conducted to a second carbamate still (5) maintained at a temperature of 120° C. and 20 pounds per square inch absolute pressure, wherein the remaining ammonium carbamate, ammonia and some water, comprising 11 parts, 8 parts, and 38 parts respectively, are distilled and conducted to a second carbamate absorber (6).

The solution of 137.3 parts urea in 57 parts water remaining in second carbamate still (5) is treated as desired for concentration and/or production of crystal urea, while the distillate just previously described is absorbed in a second carbamate absorber (6), maintained at a temperature of 60° C., and 15 pounds per square inch absolute pressure, into which 15.8 parts of water is introduced. This condensate, with the added water, comprising 11 parts ammonium carbamate, 8 parts ammonia, and 53.8 parts water, is conveyed to the first carbamate absorber (4) and there utilized for absorption of distillate evolved from first carbamate still (3) to give a solution, comprising 76.5 parts ammonium carbamate, 30 parts ammonia, and 58.8 parts water, which is returned to the autoclave (1) for reaction with the previously described 100.7 parts carbon dioxide and 214.5 parts ammonia to form further quantities of urea.

*Example 2.*—Referring to Figure II, into a pressure resistant urea converter (1), maintained at 200–220° C., and 6000 pounds per square inch absolute pressure, there is introduced 214.5 parts by weight of ammonia, 100.7 parts of carbon dioxide and 165.3 parts of a solution comprising ammonia, ammonium carbamate and water, hereinafter described. The resultant urea synthesis melt, comprising 76.5 parts ammonium carbamate, 137.3 parts urea, 166.7 parts ammonia and 100 parts water is then treated as described in Example 1 for separation of reactants unconverted in the synthesis operation, except that the 15.8 parts of water which is described in Example 1 as being introduced to the second carbamate absorber (6) is instead introduced into the first carbamate absorber (4), in order to maintain liquid the distillate from the first carbamate still when combined with the liquefied distillate from the second carbamate absorber (6).

*Example 3.*—Referring to drawing Figure III, into a pressure resistant urea converter (1) there is introduced, in a cyclic system as described in Examples 1 and 2, 227.3 parts by weight of ammonia, 106.9 parts carbon dioxide, and 146.3 parts of a solution comprising water, ammonia and ammonium carbamate hereinafter to be described. These materials are caused to react at a temperature of 200–220° C., and about 6000 pounds per square inch absolute pressure to give a urea synthesis melt comprising 76.5 parts ammonium carbamate, 137.3 parts urea, 166.7 parts ammonia, and 100.0 parts water. This urea synthesis melt is then conducted to an ammonia still (2) where the melt is distilled as in Example 1, at a pressure of 185 pounds per square inch absolute pressure and 120° C., evolving 136.7 parts ammonia which is reconducted, together with 90.6 parts fresh added ammonia, to the autoclave for further synthesis.

The distillation residue, comprising 76.5 parts ammonium carbamate, 137.3 parts urea, 30 parts ammonia and 100 parts water, is thereafter conducted to a first carbamate still (3) and distilled at a temperature of 120° C., and 60 pounds per square inch absolute pressure to drive off 65.5 parts of ammonium carbamate, 22 parts ammonia, and 5 parts water. This distillate is thence conducted to a first carbamate absorber (4) maintained at 70° C., and 53 pounds per square inch absolute pressure, where it is absorbed in 53.8 parts of added water. The distillation residue in the first carbamate still (3), comprising 11 parts ammonium carbamate, 137.3 parts urea, 8 parts ammonia, and 95 parts water, is conducted to a second carbamate still (5), maintained at 120° C., and 20 pounds per square inch absolute pressure, wherein the remaining ammonium carbamate, ammonia and some water are distilled and conducted to a second carbamate absorber or condenser (6), to be removed therefrom and utilized as desired, as, for example, to prepare ammonium sulfate. The solution of 137.3 parts urea in 57 parts water is treated as desired for concentration and/or production of crystal urea.

The distillate from the first carbamate still (3) previously described as absorbed in 53.8 parts water in the first carbamate absorber (4), is reconducted to the autoclave for further synthesis to urea as described in Example 2.

*Example 4.*—Referring to Figure IV, into a pressure resistant urea converter (1) there is introduced, in a cyclic system, 259.5 parts by weight of ammonia, 119.5 parts carbon dioxide, and 172 parts of solution comprising water, ammonia and ammonium carbamate hereinafter described. These materials are caused to react at a temperature of 200–210° C., and about 6000 pounds per square inch absolute pressure to give a urea synthesis melt comprising 91.0 parts ammonium carbamate, 163.0 parts urea, 197.0 parts ammonia, and 100 parts water. This urea synthesis melt is led to an ammonia still (2), where the melt is distilled at a pressure of 185 pounds per square inch absolute pressure and 118° C., evolving 167.0 parts of ammonia which is reconducted, together with 92.5 parts additional ammonia, to the autoclave (1) for further synthesis.

The distillation residue, comprising 91.0 parts ammonium carbamate, 163 parts urea, 30 parts ammonia and 100 parts water, is thereafter conducted to a first carbamate still (3), and distilled at a temperature of 120° C., and 69 pounds per square inch absolute pressure to drive off 76 parts of ammonium carbamate, 22.1 parts ammonia, and 5 parts water. The distillate is thence conducted to a first carbamate absorber (4), maintained at 55° C., and 64 pounds per square inch absolute pressure where it is absorbed in a receiving liquid hereinafter to be described.

The distillation residue in the first carbamate still (3), comprising 15 parts ammonium carbamate, 163 parts urea, 7.9 parts ammonia, and 95 parts water, is conducted to a second carbamate still (5), maintained at a temperature of 120° C., and 14 pounds per square inch absolute pressure wherein the remaining ammonium carbamate, ammonia and some water, comprising 15 parts, 7.9 parts and 46 parts respectively, are distilled and conducted to a second carbamate absorber (6).

The solution of 163 parts urea in 49 parts water is treated as desired for concentration and/or production of crystal urea, while the distillate just previously described is absorbed or condensed in a carbamate absorber (6), maintained at a temperature of 35° C., and 9 pounds per square inch absolute pressure. This condensate, comprising 15 parts ammonium carbamate, 7.9 parts ammonia and 46 parts water, is conveyed to first carbamate absorber (4) and there utilized as the receiving liquid previously described for absorption of distillate evolved from (3), to give a solution comprising 91 parts ammonium carbamate, 30 parts ammonia, and 51 parts water, which is returned to the autoclave (1) for reaction with the previously described 119.5 parts carbon dioxide and 259.5 parts ammonia to form further quantities of urea.

I claim:

1. In a cyclical process for the synthesis of urea by heating ammonia and carbon dioxide at urea-forming temperatures and pressures in the presence of a substantial excess of ammonia over the stoichiometrical requirements, the steps which comprise subjecting the urea synthesis melt to a primary pressure distillation at a pressure below that existing during the urea synthesis, in which at least the major part of the excess ammonia is recovered and returned to the reaction zone, and thereafter subjecting the resultant material to a two-stage secondary distillation at succeedingly lower pressures than that of the primary distillation in which the unconverted ammonium carbamate, the remainder of excess ammonia, and at least a part of the water contained therein are recovered and returned to the reaction zone, with fresh ammonia and carbon dioxide, at urea-forming temperature and pressure.

2. Process as in claim 1, in which the ammonium carbamate-residual excess ammonia-water distillate from the second stage of the two-stage secondary distillation is utilized as an absorbing liquid for the ammonium carbamate-excess ammonia-water distillate of the first stage of the two-stage secondary distillation.

3. Process as in claim 1, in which water is added to the ammonium carbamate-residual-ammonia-water distillate from the second stage of the two-stage secondary distillation and the resulting solution is utilized as an absorbing liquid for the ammonium carbamate-excess ammonia-water distillate of the first stage of the two-stage secondary distillation.

4. Process as in claim 1, in which at urea synthesis temperatures of about 170° to about 220° C. and pressures of about 3000 to about 6000 pounds per square inch the ammonium carbamate residual-excess ammonia-water distillate from the second stage of the two-stage secondary distillation is utilized as an absorbing liquid for the ammonium carbamate-excess ammonia-water distillate of the first stage of the two-stage secondary distillation.

5. Process as in claim 1 in which at urea synthesis temperatures of about 170° to about 220° C. and pressures of about 3000 to about 6000 pounds per square inch the water is added to the ammonium carbamate-residual ammonia-water distillate from the second stage of the two-stage secondary distillation and the resulting solution is utilized as an absorbing liquid for the ammonium carbamate-excess ammonia-water distillate of the first stage of the two-stage secondary distillation.

6. Process as in claim 1, in which at urea synthesis temperatures of about 200 to about 210° C. and a pressure of about 6000 pounds per square inch the ammonium carbamate residual-excess ammonia-water distillate from the second stage of the two-stage secondary distillation is utilized as an absorbing liquid for the ammonium carbamate-excess ammonia-water distillate of the first stage of the two-stage secondary distillation.

7. Process as in claim 1 in which at urea synthesis temperatures of about 200 to about 210° C. and a pressure of about 6000 pounds per square inch the water is added to the ammonium carbamate-residual ammonia-water distillate from the second stage of the two-stage secondary distillation and the resulting solution is utilized as an absorbing liquid for the ammonium carbamate-excess ammonia-water distillate of the first stage of the two-stage secondary distillation.

8. In a cyclical process for the synthesis of urea by heating ammonia and carbon dioxide at urea-forming temperatures and pressures in the presence of a substantial excess of ammonia over the stoichiometrical requirements, the steps which require subjecting the urea synthesis melt to a primary pressure distillation at a pressure below that existing during the urea synthesis, in which at least the major part of the excess ammonia is recovered and returned to the reaction zone, and thereafter subjecting the resultant material to a two-stage secondary distillation at succeedingly lower pressures than that of the primary distillation, in which a part of the unconverted ammonium carbamate, excess ammonia, and water, being that part which is obtained from the first stage of the two-stage secondary distillation, is returned with added water to the reaction zone, with fresh ammonia and carbon dioxide, at urea-forming temperatures and pressures.

9. In a cyclical process for the synthesis of urea by heating ammonia and carbon dioxide at urea-forming temperatures and pressures in the presence of a substantial excess of ammonia over the stoichiometrical requirements, the steps which comprise subjecting the urea synthesis melt to a primary pressure distillation at a pressure below that existing during the urea synthesis, in which at least a major part of the excess ammonia is recovered, and thereafter subjecting the resultant material to a two-stage secondary distillation at succeedingly lower pressures than that of the primary distillation in which a part of the unconverted ammonium carbamate, excess ammonia, and water, being that part which is obtained from the first stage of the two-stage secondary distillation, is returned with added water to the reaction zone, with fresh ammonia and carbon dioxide to urea-forming temperatures and pressures.

10. The process for the synthesis of urea by heating ammonia and carbon dioxide at urea-forming temperatures and pressures in the presence of a substantial excess of ammonia over the stoichiometrical requirements which includes the steps of subjecting the urea synthesis melt to a primary pressure distillation at temperatures of about 118° C. to about 120° C., and pressures of about 185 lbs. per square inch absolute, in which at least the major part of the excess ammonia is recovered, and thereafter subjecting the resultant residual material to a two-stage secondary distillation at about the same temperature but at about 116 lbs. per square inch to about 125 lbs. per square inch and about 165 lbs. per square inch to about 171 lbs. per square inch lower pressures, respectively, than in the primary pressure distillation, in which two-stage secondary distillation the unconverted ammonium carbamate, the remainder of excess ammonia, and at least a part of the water contained therein are recovered and returned to the reaction zone, the ammonium carbamate-residual excess ammonia-water distillate from the second stage of the two-stage secondary distillation being utilized as an absorbing liquid for the ammonium carbamate-excess ammonia-water distillate of the first stage of the two-stage secondary distillation.

11. The process for the synthesis of urea by heating ammonia and carbon dioxide at urea-forming temperatures and pressures in the presence of a substantial excess of ammonia over the stoichiometrical requirements which includes the steps of subjecting the urea synthesis melt to a primary pressure distillation at temperatures of about 118 to about 120° C., and pressures of about 185 lbs. per square inch absolute, in which at least the major part of the excess ammonia is recovered, and thereafter subjecting the resultant residual material to a two-stage secondary distillation at about the same temperature but at about 125 lbs. per square inch and about 165 lbs. per square inch lower pressures, respectively, than in the primary pressure distillation, in which two-stage secondary distillation the unconverted ammonium carbamate, the remainder of excess ammonia, and at least a part of the water contained therein are recovered and returned to the reaction zone, the ammonium carbamate-residual excess ammonia-water distillate from the second stage of the two-stage secondary distillation being utilized as an absorbing liquid for the ammonium carbamate-excess ammonia-water distillate of the first stage of the two-stage secondary distillation.

12. The process for the synthesis of urea by heating ammonia and carbon dioxide at urea-forming temperatures and pressures in the presence of a substantial excess of ammonia over the stoichiometrical requirements which includes the steps of subjecting the urea synthesis melt to a primary pressure distillation at temperatures of about 118 to about 120° C., and pressures of about 185 lbs. per square inch absolute, in which at least the major part of the excess ammonia is recovered, and thereafter subjecting the resultant residual material to a two-stage secondary distillation at about the same temperature but at about 116 lbs. per square inch to about 125 lbs. per square inch and about 165 to about 171 lbs. per square inch lower pressures, respectively, than in the primary pressure distillation, in which two-stage secondary distillation the unconverted ammonium carbamate, the remainder of excess ammonia, and at least a part of the water contained therein are recovered and returned to the reaction zone, and adding water to the ammonium carbamate-residual excess ammonia-water distillate from the second stage of the two-stage secondary distillation and utilizing the resultant solution as an absorbing liquid for the ammonium carbamate-excess ammonia-water distillate of the first stage of the two-stage secondary distillation.

13. The process for the synthesis of urea by heating ammonia and carbon dioxide in the presence of a substantial excess of ammonia over the stoichiometrical requirements at temperatures of about 170° C. to about 220° C., and pressures of about 3000 to about 6000 lbs. per square inch which includes the steps of subjecting the urea synthesis melt to a primary pressure distillation, and a temperature of about 118 to about 120° C. and a pressure of about 185 lbs. per square inch absolute, in which at least the major part of the excess ammonia is recovered and returned to the reaction zone, and thereafter subjecting the resultant residual material to a two-stage secondary distillation at succeedingly lower pressures than that of the primary distillation in which the unconverted ammonium carbamate, the remainder of excess ammonia, and at least a part of the water contained therein are recovered and returned to the reaction zone, with fresh ammonia and carbon dioxide.

14. In a process for the synthesis of urea by heating ammonia and carbon dioxide in the presence of a substantial excess of ammonia over the stoichiometrical requirements at temperatures of about 170° C. to about 220° C., and pressures of about 3000 to about 6000 lbs. per square inch which includes the steps of subjecting the urea synthesis melt to a primary pressure distillation at a temperature of about 118 to about 120° C. and a pressure of about 185 lbs. per square inch absolute, in which at least the major part of the excess ammonia is recovered and returned to the reaction zone, and thereafter subjecting the resultant residual material to a two-stage secondary distillation at about the same temperatures but at about 125 and about 165 lbs. per square inch lower pressures, respectively, than in the primary pressure distillation, in which the unconverted ammonium carbamate, the remainder of excess ammonia, and at least a part of the water contained therein are recovered and returned to the reaction zone, with fresh ammonia and carbon dioxide.

15. In a cyclical process for the synthesis of urea by heating ammonia and carbon dioxide at superatmospheric pressure in the presence of a substantial excess of ammonia over the stoichiometrical requirements at temperatures of about 170° to about 220° C. and pressures of about 3000 to about 6000 pounds per square inch, the steps which comprise subjecting the urea synthesis melt to a primary pressure distillation at a pressure below that existing during the urea synthesis in which at least the major part of the excess ammonia is recovered, and thereafter subjecting the resultant material to a two-stage secondary distillation at succeedingly lower pressures than that of the primary distillation in which the unconverted ammonium carbamate, the remainder of excess ammonia and at least a part of the water contained therein are recovered and returned to the reaction zone, and submitting all said materials returned to the reaction zone, with fresh ammonia and carbon dioxide, to urea-forming temperature and pressure.

16. In a cyclical process for the synthesis of urea by heating ammonia and carbon dioxide at superatmospheric pressure in the presence of a substantial excess of ammonia over the stoichiometrical requirements at temperatures of about 170° to about 220° C. and pressures of about 3000 to about 6000 pounds per square inch, the steps which comprise subjecting the urea synthesis melt to a primary pressure distillation at a pressure below that existing during the urea synthesis in which at least the major part of the excess ammonia is recovered and returned to the reaction zone, and thereafter subjecting the resultant material to a two-stage secondary distillation at succeedingly lower pressures than that of the primary distillation in which a part of the unconverted ammonium carbamate, excess ammonia, and water, being that part which is obtained from the first stage of the two-stage secondary distillation is returned, with added water, to the reaction zone, with fresh ammonia and carbon dioxide, to urea-forming temperature and pressure.

17. In a cyclical process for the synthesis of urea by heating ammonia and carbon dioxide at superatmospheric pressure in the presence of a substantial excess of ammonia over the stoichiometrical requirements at temperatures of about 170° to about 220° C. and pressures of about 3000 to about 6000 pounds per square inch, the steps which comprise subjecting the urea synthesis melt to a primary pressure distillation at a pressure below that existing during the urea synthesis in which at least the major part of the excess ammonia is recovered, and thereafter subjecting the resultant material to a two-stage secondary distillation at succeedingly lower pressures than that of the primary distillation in which a part of the unconverted ammonium carbamate, excess ammonia and water, being that part which is obtained from the first stage of the two-stage secondary distillation is returned, with added water, to the reaction zone, with fresh ammonia and carbon dioxide, to urea forming temperature and pressure.

18. In a cyclical process for the synthesis of urea by heating ammonia and carbon dioxide at superatmospheric pressure in the presence of a substantial excess of ammonia over the stoichiometrical requirements at temperatures of about 200 to about 210° C. and pressure of about 6000 pounds per square inch, the steps which comprise subjecting the urea synthesis melt to a primary pressure distillation at a pressure below that existing during the urea synthesis in which at least the major part of the excess ammonia is recovered and returned to the reaction zone, and thereafter subjecting the resultant material to a two-stage secondary distillation at succeedingly lower pressures in which a part of the unconverted ammonium carbamate, excess ammonia, and water, being that part which is obtained from the first stage of the two-stage secondary distillation is returned, with added water, to the reaction zone, with fresh ammonia and carbon dioxide, to urea-forming temperatures and pressures.

HARALD W. DE ROPP.